United States Patent [19]
Guo

[11] Patent Number: 5,475,073
[45] Date of Patent: * Dec. 12, 1995

[54] HYDROXY-FUNCTIONAL ACRYLATE RESINS

[75] Inventor: Shao-Hua Guo, West Goshen, Pa.

[73] Assignee: Arco Chemical Technology, L.P., Greenville, Del.

[ * ] Notice: The portion of the term of this patent subsequent to Jan. 17, 2012, has been disclaimed.

[21] Appl. No.: 341,823

[22] Filed: Nov. 18, 1994

[51] Int. Cl.$^6$ ............... C08F 216/12; C08F 216/02; C08F 216/08

[52] U.S. Cl. ............... 526/333; 526/307.5; 526/317.1; 526/318.2; 526/319; 526/332; 526/338; 526/342; 526/344; 526/329; 526/329.1

[58] Field of Search ............... 526/333, 328.5, 526/329, 329.1

[56] References Cited

U.S. PATENT DOCUMENTS

| | | |
|---|---|---|
| 2,965,615 | 12/1960 | Tess . |
| 3,028,367 | 4/1962 | O'Brien . |
| 3,267,058 | 8/1966 | Hixenbaugh . |
| 3,268,561 | 8/1966 | Peppel et al. ............... 549/561 |
| 3,423,341 | 1/1969 | Klare et al. . |
| 3,457,324 | 7/1969 | Sekmakas . |
| 3,483,152 | 12/1969 | Koch . |
| 4,276,212 | 6/1981 | Khanna et al. . |
| 4,330,458 | 5/1982 | Spinelli et al. ............... 525/162 |
| 4,501,868 | 2/1985 | Bouboulis et al. ............... 526/208 |
| 4,609,717 | 9/1986 | Greigger et al. ............... 528/45 |
| 4,618,659 | 10/1986 | Kania et al. ............... 525/455 |
| 4,618,703 | 10/1986 | Thanawalla et al. ............... 560/209 |
| 5,382,642 | 1/1995 | Guo ............... 526/333 |

FOREIGN PATENT DOCUMENTS

| | | | |
|---|---|---|---|
| 45-28786 | 9/1970 | Japan ............... | 526/333 |

OTHER PUBLICATIONS

Swern et al., *J. Am. Chem. Soc.* 71 (1949) 1152.
W. Gum et al., *Reaction Polymers* (1992), pp. 234–240.

*Primary Examiner*—Fred Zitomer
*Attorney, Agent, or Firm*—Jonathan L. Schuchardt

[57] ABSTRACT

Low-molecular-weight, hydroxy-functional acrylate resins are disclosed. The resins are copolymers derived from an allylic alcohol or a propoxylated allylic alcohol, an acrylate or methacrylate monomer, and optionally, one or more additional ethylenic monomers. The resins are uniquely prepared without a chain-transfer agent or reaction solvent, and are useful in many thermoset polymer applications, including thermoset polyesters, polyurethanes, crosslinked polymeric resins, melamines, alkyds, uralkyds, and epoxy thermosets.

5 Claims, No Drawings

HYDROXY-FUNCTIONAL ACRYLATE RESINS

FIELD OF THE INVENTION

The invention relates to low-molecular-weight hydroxy-functional acrylate resins and their use in polyurethanes, melamines, epoxies, and other thermoset polymers. In particular, the invention relates to hydroxy-functional acrylate resins derived from allylic alcohols or propoxylated allylic alcohols and acrylate monomers.

BACKGROUND OF THE INVENTION

Hydroxy-functional acrylate resins of relatively low molecular weight (typically 1000 to 3000) are valuable reactive intermediates for making high-performance coatings and other thermoset polymers. The resins are crosslinked with melamines, isocyanates, or epoxy resins to give useful thermoset polymers.

Hydroxy-functional acrylate resins are typically made by copolymerizing hydroxyacrylate monomers such as 2-hydroxyethyl acrylate, 2-hydroxypropyl acrylate, or the like, often with other ordinary acrylate monomers (butyl acrylate, ethyl acrylate, etc.). Resins having sufficiently low molecular weight are difficult to make because acrylate monomers are highly reactive and tend to form polymers of high molecular weight.

To limit polymer molecular weight, resin producers include a large amount of a chain-transfer agent, such as a mercaptan, in the polymerization system. The chain-transfer agent usually remains in the acrylate resin. Other than limiting polymer molecular weight, chain-transfer agents provide no benefit for acrylate resins. In fact, chain-transfer agents add cost, often introduce objectionable odors, and can adversely impact resin performance.

Acrylate resin producers commonly use a solution polymerization to control reaction rates. To get a neat resin, the solvent must subsequently be removed from the resin. Optionally, the resin is sold as a solution, but this limits the utility of the product because formulators may prefer a different solvent than the one used for manufacture.

Hydroxyacrylate monomers, which provide hydroxyl functionality to an acrylate resin, are fairly expensive. Less costly ways to introduce hydroxyl functionality into acrylate resins are of interest.

New hydroxy-functional acrylate resins are needed. Preferably, low-molecular-weight resins could be made without the need to use a chain-transfer agent or a reaction solvent. Ideally, the resins would have both acrylate and hydroxyl functionalities, and would be made from inexpensive starting materials. Also needed are hydroxy-functional acrylate resins useful in high-solids, low-VOC formulations, particularly those having high hydroxyl-group contents and low viscosities. Preferred resins would be useful in a broad array of thermoset polymers, such as polyurethanes, epoxies, and melamines.

SUMMARY OF THE INVENTION

The invention is a low-molecular-weight, hydroxy-functional acrylate resin. The resin comprises recurring units of an allylic alcohol and an acrylate or methacrylate monomer. Optionally, the resin includes recurring units of one or more additional ethylenic monomers. The acrylate resin has a hydroxyl number within the range of about 20 to about 500 mg KOH/g, and a number average molecular weight within the range of about 500 to about 10,000.

The invention includes a low-molecular-weight, hydroxy-functional acrylate resin prepared from a propoxylated allylic alcohol and an acrylate or methacrylate monomer. These resins also optionally include recurring units of an ethylenic monomer.

The low-molecular-weight acrylate resins of the invention are uniquely prepared in the absence of a chain-transfer agent, and do not require a solvent during preparation to control reactivity. The allylic alcohol or propoxylated allylic alcohol functions as a reactive monomer, chain-transfer agent, and rate-controlling solvent. The acrylate resins have high hydroxyl functionality, but are low in cost because they are made from less expensive and readily available monomers such as ordinary acrylates and allyl alcohol. The resins have relatively low viscosities and low molecular weights at useful hydroxyl group contents, making them particularly valuable for high-solids, low-VOC formulations.

The acrylate resins of the invention are useful in many thermoset polymer applications, including thermoset polyesters, polyurethanes, crosslinked polymeric resins, melamines, alkyds, uralkyds, and epoxy thermosets.

DETAILED DESCRIPTION OF THE INVENTION

The low-molecular-weight, hydroxy-functional acrylate resins of the invention comprise recurring units of an allylic alcohol or propoxylated allylic alcohol, an acrylate or methacrylate monomer, and optionally, an ethylenic monomer.

Allylic alcohols useful in the invention preferably have the general structure $CH_2=CR-CH_2-OH$ in which R is selected from the group consisting of hydrogen and $C_1-C_5$ alkyl. Suitable allylic alcohols include, but are not limited to, allyl alcohol, methallyl alcohol, 2-ethyl-2-propen-1-ol, and the like, and mixtures thereof. Allyl alcohol and methallyl alcohol are preferred.

A propoxylated allylic alcohol can be used instead of or in addition to the allylic alcohol. Preferred propoxylated allylic alcohols have the general structure $CH_2=CR'-CH_2-(A)_n-OH$ in which A is an oxypropylene group, R' is selected from the group consisting of hydrogen and $C_1C_5$alkyl, and n, which is the average number of oxypropylene groups in the propoxylated allylic alcohol, has a value less than or equal to 2. The oxypropylene groups in the propoxylated allylic alcohols have one or both of the structures $-OCH(CH_3)-CH_2-$ and $-O-CH_2-CH(CH_3)-$, which will depend upon the method of synthesis.

Suitable propoxylated allylic alcohols can be prepared by reacting an allylic alcohol with up to about 2 equivalents of propylene oxide in the presence of a basic catalyst as described, for example, in U.S. Pat. Nos. 3,268,561 and 4,618,703, the teachings of which are incorporated herein by reference. As will be apparent to those skilled in the art, suitable propoxylated allylic alcohols can also be made by acid catalysis, as described, for example, in *J. Am. Chem. Soc.* 71 (1949) 1152.

The amount of allylic alcohol or propoxylated allylic alcohol used in the acrylate resins of the invention depends many factors, but most important among these is the desired hydroxyl group content of the resin. Generally, it is preferred to incorporate into the resin an amount of allylic alcohol or propoxylated allylic alcohol within the range of about 5 to about 60 wt. %; a more preferred range is from about 10 to about 50 wt. %.

The hydroxy-functional acrylate resins of the invention include an ordinary acrylate or methacrylate monomer. Suitable monomers include $C_1$–$C_{20}$alkyl or aryl acrylates or methacrylates. Especially preferred are $C_1$–$C_{10}$alkyl acrylates or methacrylates. Examples include, but are not limited to, methyl acrylate, methyl methacrylate, ethyl acrylate, butyl acrylate, butyl methacrylate, and the like, and mixtures thereof. It is often advantageous to use mixtures of various acrylates and methacrylates to control the resin glass-transition temperature.

The acrylate or methacrylate monomer is commonly the major component in the resin. The amount used depends on many factors, particularly the desired end use for the resin. Preferably, the resin will comprise an amount within the range of about 40 to about 95 wt. % of recurring units derived from the acrylate or methacrylate monomer; a more preferred range is from about 50 to about 90 wt. %.

An ethylenic monomer is optionally included in the acrylate resins of the invention. The monomer is selected to modify or improve end-use properties such as surface gloss, hardness, chemical resistance, and other properties. Preferred ethylenic monomers include vinyl aromatic monomers, unsaturated nitriles, vinyl esters, vinyl ethers, vinyl halides, vinylidene halides, unsaturated anhydrides, unsaturated dicarboxylic acids, acrylic and methacrylic acids, acrylamide and methacrylamide, conjugated dienes, and mixtures thereof. Suitable ethylenic monomers include, for example, styrene, acrylonitrile, vinyl acetate, methyl vinyl ether, vinyl chloride, vinylidene chloride, maleic anhydride, maleic acid, fumaric acid, and the like. Preferred ethylenic monomers are vinyl aromatic monomers, unsaturated nitriles, and mixtures thereof, especially styrene and acrylonitrile.

The acrylate resins of the invention preferably include from about 0.1 to about 50 wt. % of recurring units derived from the optional ethylenic monomer. A more preferred range is from about 5 to about 10 wt. % of recurring units derived from the ethylenic monomer.

The acrylate resins of the invention have number average molecular weights within the range of about 500 to about 10,000. A more preferred range is from about 1000 to about 3000.

The acrylate resins have hydroxyl numbers within the range of about 20 to about 500 mg KOH/g. A more preferred range is from about 100 to about 250 mg KOH/g.

The average hydroxyl functionality of the acrylate resins is generally from about 1 to about 10. A preferred range is from about 2 to about 5.

The acrylate resins preferably have glass transition temperatures (Tg) within the range of about −50° C. to about 150° C. A more preferred range is from about −20° C. to about 100° C.

The invention includes a process for making hydroxyfunctional acrylate resins of the invention. The process comprises copolymerizing a $C_1$–$C_{20}$alkyl or aryl acrylate or methacrylate monomer with an allylic alcohol or a propoxylated allylic alcohol, optionally in the presence an ethylenic monomer, in the presence of a free-radical initiator, to produce a hydroxy-functional acrylate resin.

The key to the process is to add at least about 50 wt. %, preferably at least about 70 wt. %, of the acrylate or methacrylate monomer to the reaction mixture gradually during the course of the polymerization. Preferably, the acrylate or methacrylate monomer is added at such a rate as to maintain a steady, low concentration of the acrylate monomer in the reaction mixture. Preferably, the ratio of allylic to acrylate monomers is kept fairly constant; this helps to produce a resin having a relatively uniform composition. Gradual addition of the acrylate monomer enables the preparation of acrylate resins having sufficiently low molecular weight and sufficiently high allylic alcohol or propoxylated allylic alcohol content.

Acrylate resins of the invention preferably comprise from about 5 to about 60 wt. % of recurring units derived from the allylic alcohol or propoxylated allylic alcohol, and from about 40 to about 95 wt. % of recurring units derived from the acrylate or methacrylate monomer. The resins have hydroxyl numbers within the range of about 20 to about 500 mg KOH/g, and number average molecular weights within the range of about 500 to about 10,000.

The free-radical initiator is preferably a peroxide, hydroperoxide, or azo compound. Preferred initiators have a decomposition temperature greater than about 100° C. Examples include tert-butyl hydroperoxide, di-tert-butyl peroxide, tert-butyl perbenzoate, cumene hydroperoxide, dicumyl peroxide, and the like.

The amount of free-radical initiator needed varies, but is generally within the range of about 0.1 to about 10 wt. % based on the amount of monomers. Preferably, the amount of free-radical initiator used is within the range of about 1 to about 5 wt. %; most preferred is the range from about 2 to about 4 wt. %.

Generally, it is preferred to add the free-radical initiator to the reactor gradually during the course of the polymerization; it is also desirable to match the addition rate of the free-radical initiator to the addition rate of the acrylate or methacrylate monomer.

When an optional ethylenic monomer is included in the process, it is preferred to add it in proportion to the acrylate or methacrylate monomer. For example, if half of the acrylate monomer is charged initially to the reactor, and half is added gradually, then it is preferred to charge half of the ethylenic monomer initially and add the remaining portion with the acrylate monomer. As with the acrylate monomer, all of the ethylenic monomer can be added gradually.

The process of the invention can be performed over a broad temperature range. Generally, the reaction temperature will be within the range of about 60° C. to about 300° C. A more preferred range is from about 90° C. to about 200° C.; most preferred is the range from about 100° C. to about 180° C.

The process of the invention is advantageously performed in the absence of any reaction solvent, but a solvent may included if desired. Useful solvents include those that will not interfere with the free-radical polymerization reaction or otherwise react with the monomers. Suitable solvents include, but are not limited to, ethers, esters, ketones, aromatic and aliphatic hydrocarbons, alcohols, glycol ethers, glycol ether esters, and the like, and mixtures thereof.

The invention includes thermoset polymers derived from the acrylate resins, including melamines, polyurethanes, epoxy thermosets, thermoset polyesters, alkyds, and uralkyds.

The invention includes thermoset polymers prepared by reacting the acrylate resins of the invention with a crosslinking agent. For example, melamine-based polymers, especially coatings, can be prepared by reacting the acrylate resins with melamine resins. Suitable melamine resins include commercial grade hexamethoxymethylmelamines, such as, for example, CYMEL 303 crosslinking agent, a product of American Cyanamid Company. Examples 6–8 and 16–17 below illustrate the preparation of melamine coatings from acrylate resins of the invention. A crosslinked polymeric resin is obtained by reacting an acrylate resin of the invention with a polymeric crosslinking agent. Suitable polymeric crosslinking agents are anhydride or carboxylic acid-containing polymers such as, for example, polyacrylic acid, polymethacrylic acid, isobutylene-maleic anhydride copolymers, and styrene-maleic anhydride copolymers. Example 13 below illustrates the preparation of a crosslinked polymeric film of this type from an acrylate resin of the invention and a styrene-maleic anhydride copolymer.

A polyurethane composition is made by reacting an acrylate resin of the invention with a di- or polyisocyanate or an isocyanate-terminated prepolymer. Prepolymers derived from the acrylate resins of the invention can be used. Optionally, a low molecular weight chain extender (diol, diamine, or the like) is included. Suitable di- or polyisocyanates are those well known in the polyurethane industry, and include, for example, toluene diisocyanate, MDI, polymeric MDIs, carbodiimide-modified MDIs, hydrogenated MDIs, isophorone diisocyanate, and the like. Isocyanate-terminated prepolymers are made in the usual way from a polyisocyanate and a polyether polyol, polyester polyol, or the like. The polyurethane is formulated at any desired NCO index, but it is preferred to use an NCO index close to 1. If desired, all of the available NCO groups are reacted with hydroxy groups from the acrylate resins and any chain extenders. Alternatively, an excess of NCO groups remain in the product, as in a moisture-cured polyurethane. Many types of polyurethane products can be made, including, for example, adhesives, sealants, coatings, and elastomers. Examples 9–11 below illustrate polyurethane coatings prepared from an isocyanate-terminated prepolymer and an acrylate resin of the invention. Other suitable methods for making polyurethane compositions are described in U.S. Pat. No. 2,965,615, the teachings of which are incorporated herein by reference.

The invention includes epoxy thermosets, which are the reaction products of an acrylate resin of the invention and an epoxy resin. Suitable epoxy resins generally have two or more epoxy groups available for reaction with the hydroxyl groups of the acrylate resin. Particularly preferred epoxy resins are bisphenol-A diglycidyl ether and the like. Example 15 below illustrates the preparation of an epoxy thermoset from bisphenol-A diglycidyl ether and an acrylate resin of the invention. Other suitable methods for making epoxy thermosets are described in U.S. Pat. No. 4,609,717, the teachings of which are incorporated herein by reference.

The invention includes thermoset polyesters that are the reaction products of the acrylate resins of the invention and an anhydride or a di- or polycarboxylic acid. The use of such a reaction to prepare a thermoset polyester coating from an acrylate resin of the invention is shown in Example 12 below. Suitable anhydrides and carboxylic acids are those commonly used in the polyester industry. Examples include, but are not limited to, phthalic anhydride, phthalic acid, maleic anhydride, maleic acid, adipic acid, isophthalic acid, terephthalic acid, sebacic acid, succinic acid, trimellitic anhydride, and the like, and mixtures thereof. Other suitable methods for making thermoset polyesters are described in U.S. Pat. No. 3,457,324, the teachings of which are incorporated herein by reference.

The invention includes alkyd compositions prepared by reacting an acrylate resin of the invention with an unsaturated fatty acid. Suitable unsaturated fatty acids are those known in the art as useful for alkyd resins, and include, for example, oleic acid, ricinoleic acid, linoleic acid, licanic acid, and the like, and mixtures thereof. Mixtures of unsaturated fatty acids and saturated fatty acids such as lauric acid or palmitic acid can also be used. The alkyd resins are particularly useful for making alkyd coatings. For example, an acrylate resin, or a mixture of an acrylate resin and glycerin or another low molecular weight polyol, is first partially esterified with an unsaturated fatty acid to give an alkyd resin. The resin is then combined with an organic solvent, and the resin solution is stored until needed. A drying agent such as cobalt acetate is added to the solution of alkyd resin, the solution is spread onto a surface, the solvent evaporates, and the resin cures leaving an alkyd coating of the invention. Example 14 below shows one way to make an alkyd coating of the invention. Other suitable methods for making alkyd resins and coatings are described in U.S. Pat. No. 3,423,341, the teachings of which are incorporated herein by reference.

Instead of combining the alkyd resin with an organic solvent, the resin can be dispersed in water to make a water-based alkyd coating formulation. To improve the water dispersability of the alkyd resin, a free hydroxyl group in the alkyd resin can be converted to a salt. For example, the alkyd resin can be reacted with phthalic anhydride to give a resin that contains phthalic acid residues; addition of sodium hydroxide makes the sodium phthalate salt, and provides a water-dispersable alkyd resin derived from the allyl ester copolymer. See, for example, U.S. Pat. No. 3,483,152.

The invention includes polyurethane-modified alkyds (uralkyds) prepared from the acrylate resins. These resins are especially valuable for making uralkyd coatings. The acrylate resin is first partially esterified with an unsaturated fatty acid (described above) to give an alkyd resin. The alkyd resin, which contains some free hydroxyl groups, is reacted with a di- or polyisocyanate (described above) to give a prepolymer. The prepolymer is then reacted with a chain extender, atmospheric moisture, or additional alkyd resin to give a uralkyd coating. Other suitable methods for making uralkyd resins and coatings are described in U.S. Pat. No. 3,267,058, the teachings of which are incorporated herein by reference.

The acrylate resins of the invention are well-suited for blending with other polymers. The acrylate resins are easily blended with, for example, polyether polyols, polyester polyols, phenolic resins, acrylates, and epoxy resins, and the blends can be used in the applications described earlier. The acrylate resins can also be used as compatibilizers to improve the miscibility of polymer mixtures.

The following examples merely illustrate the invention. Those skilled in the art will recognize many variations that are within the spirit of the invention and scope of the claims.

EXAMPLE 1

Hydroxy-Functional Acrylate Resin from Allyl Alcohol, Methyl Methacrylate, and 2-Ethylhexyl Acrylate Allyl alcohol (350 g), di-tert-butylperoxide (7.4 g), 2-ethylhexyl acrylate (7.4 g), and methyl methacrylate (128 g) are charged to a 1-liter stainless-steel reactor equipped with agitator, steam heating jacket, temperature controller, nitrogen inlet, vacuum distillation device, and addition pump. Di-tert-butylperoxide (22.2 g), 2-ethylhexyl acrylate (22.7 g), and methyl methacrylate (397 g) are mixed and charged into the addition pump.

The reactor is purged three times with nitrogen, sealed, and the contents are heated to 135° C. The mixture of di-tert-butylperoxide, 2-ethylhexyl acrylate, and methyl methacrylate is pumped into the reactor during the polymerization at a decreasing rate. The addition rates are as follows: Hour 1,143 g/h; hour 2, 111 g/h; hour 3, 80 g/h; hour 4, 61 g/h; hour 5, 47 g/h. The polymerization continues at 135° C. for an additional 0.5 h after completing the monomer addition. Unreacted monomers are removed by vacuum distillation (up to 160° C.) and water stripping. The resulting acrylate resin (615 g) has Mw= 4262, Mn=1585, and hydroxyl number=123 mg KOH/g.

EXAMPLE 2

Hydroxy-Functional Acrylate Resin from Allyl Alcohol, Styrene, Methyl Methacrylate, n-Butyl Methacrylate, and n-Butyl Acrylate The procedure of Example 1 is generally followed. The reactor is charged with allyl alcohol (280 g), di-tert-butylperoxide (5.9 g), styrene (9.9 g), methyl methacrylate (9.9 g), n-butyl acrylate (14.2 g), and n-butyl methacrylate (74 g). The addition pump is charged with di-tert-butylperoxide (17.8 g), styrene (34.9 g), methyl methacrylate (34.9 g), n-butyl acrylate (44.2 g), and n-butyl methacrylate (107 g).

The reactor is purged three times with nitrogen, sealed, and the contents are heated to 135° C. The mixture in the addition pump is gradually added into the reactor during the polymerization at a decreasing rate. The addition rates are as follows: Hour 1, 114 g/h; hour 2, 88 g/h; hour 3, 63 g/h; hour 4, 48 g/h; hour 5, 37 g/h. The polymerization continues at 135° C. for an additional 0.5 h after completing the monomer addition. Unreacted monomers are removed by vacuum distillation and water stripping. The resulting acrylate resin (461 g) has Mw=5180, Mn=1864, and hydroxyl number= 118 mg KOH/g.

EXAMPLE 3

Hydroxy-Functional Acrylate Resin from Allyl Alcohol, t-Butyl Acrylate, and n-Butyl Acrylate The procedure of Example 1 is generally followed. The reactor is charged with allyl alcohol (300 g), di-tert-butylperoxide (6.5 g), t-butyl acrylate (60 g), and n-butyl acrylate (58.5 g). The addition pump is charged with di-tert-butylperoxide (19.5 g), t-butyl acrylate (177 g), and n-butyl acrylate (176 g).

The reactor is purged three times with nitrogen, sealed, and the contents are heated to 135° C. The mixture in the addition pump is gradually added into the reactor during the polymerization at a decreasing rate. The addition rates are as follows: Hour 1,120 g/h; hour 2, 94 g/h; hour 3, 67 g/h; hour 4, 51 g/h; hour 5, 40 g/h. The polymerization continues at 135° C. for an additional 0.5 h after completing the monomer addition. Unreacted monomers are removed by vacuum distillation and water stripping. The resulting acrylate resin (540 g) has Mw=4800, Mn=1560, and hydroxyl number= 120 mg KOH/g.

EXAMPLE 4

Hydroxy-Functional Acrylate Resin from Propoxylated Allyl Alcohol and Methyl Methacrylate The procedure of Example 1 is generally followed. The reactor is charged with propoxylated allyl alcohol (380 g, average of 1.6 oxypropylene units per molecule). The addition pump is charged with di-tert-butylperoxide (20 g), and methyl methacrylate (380 g).

The reactor is purged three times with nitrogen, sealed, and the contents are heated to 155° C. The mixture in the addition pump is gradually added into the reactor during the polymerization at a decreasing rate. The addition rates are as follows: Hour 1,102 g/h; hour 2, 92 g/h; hour 3, 81 g/h; hour 4, 68 g/h; hour 5, 57 g/h. The polymerization continues at 155° C. for an additional 0.5 h after completing the monomer addition. Unreacted monomers are removed by vacuum distillation and water stripping. The resulting acrylate resin (613 g) has Mw=5274, Mn=1932, and hydroxyl number= 164 mg KOH/g.

EXAMPLE 5

Hydroxy-Functional Acrylate Resin from Propoxylated Allyl Alcohol,

2-Ethylhexyl Acrylate and Methyl Methacrylate

The procedure of Example 1 is generally followed. The reactor is charged with propoxylated allyl alcohol (500 g, average of 1.6 oxypropylene units per molecule), di-tert-butylperoxide (22 g), 2-ethylhexyl acrylate (5.0 g), and methyl methacrylate (87 g). The addition pump is charged with 2ethylhexyl acrylate (10 g), and methyl methacrylate (173 g).

The reactor is purged three times with nitrogen, sealed, and the contents are heated to 135° C. The mixture in the addition pump is gradually added into the reactor during the polymerization at a decreasing rate. The addition rates are as follows: Hour 1, 47 g/h; hour 2, 42 g/h; hour 3, 37 g/h; hour 4, 32 g/h; hour 5, 25 g/h. The polymerization continues at 135° C. for an additional 0.5 h after completing the monomer addition. Unreacted monomers are removed by vacuum distillation and water stripping. The resulting acrylate resin (561 g) has Mw=6332, Mn=2046, and hydroxyl number= 185 mg KOH/g.

EXAMPLE 6

Melamine Coating Composition

The acrylate resin of Example 1 (280 g) is dissolved in a mixture of methyl ethyl ketone (40 g), xylene (40 g), and ethyl acetate (40 g). A clear coating solution is prepared by mixing 30 g of the acrylate solution with 7.0 g of CYMEL 303 melamine resin (product of American Cyanamid), 0.7 g of CYCAT 4040 catalyst (40% p-toluenesulfonic acid in isopropyl alcohol, product of product of American Cyanamid), methyl ethyl ketone (10 g), and ethyl acetate (10 g). The composition is sprayed onto aluminum panels and is baked for 0.5 h at 110° C. The resulting coating is smooth, glossy, has a nice appearance, and passes pencil hardness 5H.

EXAMPLE 7

Melamine Coating Composition

The acrylate resin of Example 2 (140 g) is dissolved in a mixture of methyl ethyl ketone (20 g), xylene (20 g), and ethyl acetate (20 g). A clear coating solution is prepared by mixing 30 g of the acrylate solution with 7.0 g of CYMEL 303 melamine resin, 0.7 g of CYCAT 4040 catalyst (40% p-toluenesulfonic acid in isopropyl alcohol), methyl ethyl ketone (10 g), and ethyl acetate (10 g). The composition is sprayed onto aluminum panels and is baked for 0.5 h at 110° C. The resulting coating is smooth, glossy, has a nice appearance, and passes pencil hardness 5 H.

EXAMPLE 8

Melamine Coating Composition

The acrylate resin of Example 3 (40 g) is dissolved in methyl ethyl ketone (40 g). To the acrylate solution is added 10 g of CYMEL 303 melamine resin and 0.5 g of p-toluenesulfonic acid. The composition is sprayed onto aluminum panels and is baked for 1.0 h at 100° C. The resulting coating is smooth, glossy, and has a nice appearance.

EXAMPLE 9

Urethane Coating Composition

The acrylate resin of Example 1 (280 g) is dissolved in a mixture of methyl ethyl ketone (40 g), xylene (40 g), and ethyl acetate (40 g). To 40 g of the acrylate resin solution is added liquid MDI (8.5 g, WUC 3093T, 29.3 wt. % NCO, product of BASF), methyl ethyl ketone (10 g), and ethyl acetate (10 g). The composition is sprayed onto aluminum panels and is dried at 25° C. The resulting coating is smooth, glossy, and has a nice appearance.

EXAMPLE 10

Urethane Coating Composition

The acrylate resin of Example 2 (140 g) is dissolved in a mixture of methyl ethyl ketone (20 g), xylene (20 g), and ethyl acetate (20 g). To 40 g of the acrylate resin solution is added liquid MDI (8.5 g, WUC 3093T, 29.3 wt. % NCO), methyl ethyl ketone (10 g), and ethyl acetate (10 g). The composition is sprayed onto aluminum panels and is dried at 25° C. The resulting coating is smooth, glossy, and has a nice appearance.

EXAMPLE 11

Urethane Coating Composition

The acrylate resin of Example 3 (100 g) is dissolved in a mixture of methyl ethyl ketone (10 g), xylene (10 g), and ethyl acetate (10 g). To 36 g of the acrylate resin solution is added liquid MDI (8.5 g, WUC 3093T, 29.3 wt. % NCO), methyl ethyl ketone (5 g), and ethyl acetate (5 g). The composition is sprayed onto aluminum panels and is dried at 25° C. The resulting coating is smooth, glossy, and has a nice appearance.

EXAMPLE 12

Preparation of a Thermoset Polyester Coating

The acrylate resin of Example 1 (500 g) and isophthalic acid (47 g) are charged into a reactor and heated to 180° C. while sparging nitrogen through the mixture. After the acid number reaches 60–70 mg KOH/g, adipic acid (36.5 g), isophthalic acid (30 g), and maleic anhydride (3.0 g) are added, and the mixture is reheated to 180° C. Heating continues at 180° C. until the acid number drops to 10–12 mg KOH/g. 2-Ethoxyethanol acetate (200 g) is then added.

Six hundred grams of the resulting polyester solution is charged into a reactor equipped with an agitator, thermometer, reflux condenser, addition funnel, and nitrogen inlet, and the mixture is heated to 120° C. A mixture of 2-hydroxyethyl acrylate (10 g), ethyl acrylate (54 g), styrene (5 g), methyl methacrylate (20 g), methacrylic acid (2 g), and di-t-butylperoxide (1.0 g) is charged to the addition funnel. The acrylate monomer mixture is added to the polyester mixture over 2 h, and is then kept at 120° C. for another hour. t-Butyl perbenzoate (0.2 g) is added, and the mixture is kept at 120° C. for another 2 h. A second 0.2 g portion of t-butyl perbenzoate is added, and heating continues for another 2 h. The product solution is finally diluted with 1-butanol (30 g) and xylene (20 g). This solution is expected to be useful as a thermosettable coating. The solution can be applied as a film, and allowed to cure at room temperature or elevated temperature.

EXAMPLE 13

Preparation of a Crosslinked Polymer Film

DYLARK 332 resin (a copolymer of styrene (86%) and maleic anhydride (14%), product of ARCO Chemical Co., 10 g), and the acrylate resin of Example 1 (10 g) are dissolved in tetrahydrofuran (20 g). The solution is spread and dried on an aluminum pan. The resulting polymer film is cured at 200° C. for 0.5 h. The expected product is a cured, thermoset polymer film.

EXAMPLE 14

Preparation of an Alkyd Coating

The acrylate resin of Example 1 (174 g), safflower oil (64 g), lithium hydroxide (0.03 g), phthalic anhydride (25.5 g), maleic anhydride (0.22 g), triphenyl phosphite (0.07 g), and xylene (18 g) are charged into a reactor equipped with an agitator, thermometer, reflux condenser with a Dean-Stark trap, and nitrogen inlet. The mixture is heated to 200° C., and is kept at that temperature until the acid number drops to 10–20 mg KOH/g. After the reaction, xylene is added to dilute the mixture to 50 wt. % solids. This solution is expected to be useful as an alkyd coating. The solution can be applied as a film, and allowed to cure at room temperature or at elevated temperature.

EXAMPLE 15

Preparation of an Epoxy Thermoset

The acrylate resin of Example 1 (20 g) is blended with Shell Chemical Company's EPON Resin 1001-X-75 (75 wt. % EPON 1001F resin in xylene, 535 g/epoxide equivalent), and the blend is dissolved in methyl ethyl ketone (40 g). To this solution is added 0.4 gram of trimethylamine. When drawn down as a film with a 0.003" Bird applicator on a steel panel and baked at 200° C. for 10 min., a cured film is expected to be smooth, glossy, and nice in appearance.

EXAMPLE 16

A Polymer Blend of an Acrylate Resin and a Polyester Polyol and a Melamine Coating Prepared from the Polymer Blend The acrylate resin of Example 1 (30 g) is blended with 35 g of Cargill's high-solids polyester 57-5776 (85 wt. % solids in propylene glycol methyl ether acetate, hydroxyl number of the solids=178 mg KOH/g), and the blend is dissolved in methyl ethyl ketone (50 g). To this solution is added 30 g of CYMEL 303 melamine resin, and 2.5 g of CYCAT 4040 catalyst (40% p-toluenesulfonic acid in isopropyl alcohol). The composition is sprayed onto aluminum panels and baked for 30 min. at 110° C. The resulting coating is expected to be smooth, glossy, and nice in appearance.

EXAMPLE 17

A Polymer Blend of an Acrylate Resin and an Epoxy Resin and a Melamine Coating Prepared from the Polymer Blend The acrylate resin of Example 1 (30 g) is blended with Shell Chemical Company's EPON Resin 1001-X-75 (75 wt. % EPON 1001F resin in xylene, 465 g/epoxide equivalent), and the blend is dissolved in methyl ethyl ketone (50 g). To this solution is added CYMEL 303 melamine resin (30 g) and CYCAT 4040 catalyst (2.5 g). The composition is sprayed onto aluminum panels and is baked at 110° C. for 0.5 h. The resulting coating is expected to be smooth, glossy, and nice in appearance.

The preceding examples are meant only as illustrations; the following claims define the scope of the invention.

I claim:

1. A low-molecular-weight, hydroxy-functional acrylate resin which comprises recurring units of:
   (a) a propoxylated allylic alcohol of the formula $CH_2=CR-CH_2-(A)_n-OH$ in which A is an oxypropylene group, R is selected from the group consisting of hydrogen and $C_1-C_5$alkyl, and n, which is the average number of oxypropylene groups in the propoxylated allylic alcohol, has a value less than or equal to 2;
   (b) a $C_1-C_{20}$alkyl or aryl acrylate or methacrylate monomer, and
   (c) optionally, one or more ethylenic monomers selected from the group consisting of vinyl aromatic monomers, unsaturated nitriles, vinyl esters, vinyl ethers, vinyl halides, vinylidene halides, unsaturated anhydrides, unsaturated dicarboxylic acids, acrylic and methacrylic acids, acrylamide and methacrylamide, and conjugated dienes;
   wherein the acrylate resin has a hydroxyl number within the range of about 50 to about 450 mg KOH/g, and a number average molecular weight within the range of about 500 to about 10,000.

2. The acrylate resin of claim 1 wherein the acrylate or methacrylate monomer is a $C_1-C_{10}$alkyl acrylate or methacrylate.

3. The acrylate resin of claim 1 which comprises from about 0.1 to about 50 wt. % of an ethylenic monomer selected from the group consisting of styrene, acrylonitrile, and mixtures thereof.

4. The acrylate resin of claim 1 comprising from about 5 to about 60 wt. % of the propoxylated allylic alcohol, from about 40 to about 95 wt. % of the acrylate or methacrylate monomer, and from about 5 to about 10 wt. % of an ethylenic monomer selected from the group consisting of styrene, acrylonitrile, and mixtures thereof.

5. The acrylate resin of claim 1 having a hydroxyl number within the range of about 100 to about 250 mg KOH/g, and a number average molecular weight within the range of about 1000 to about 3000.

\* \* \* \* \*